(12) United States Patent
Beaver et al.

(10) Patent No.: US 9,846,684 B2
(45) Date of Patent: Dec. 19, 2017

(54) DYNAMIC TEXT LAYOUT RULES

(71) Applicant: Apple Inc., Cupertino, CA (US)

(72) Inventors: Jason Clay Beaver, San Jose, CA (US); Elizabeth Caroline Furches Cranfill, San Francisco, CA (US); Eric Lance Wilson, San Jose, CA (US); David Chance Graham, Campbell, CA (US); Johannes Fortmann, San Francisco, CA (US); Olivier Gutknecht, San Francisco, CA (US); Antonio Cavedoni, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 121 days.

(21) Appl. No.: 14/503,209

(22) Filed: Sep. 30, 2014

(65) Prior Publication Data
US 2015/0347356 A1 Dec. 3, 2015

Related U.S. Application Data

(60) Provisional application No. 62/005,706, filed on May 30, 2014.

(51) Int. Cl.
*G06F 17/21* (2006.01)
*G09G 5/24* (2006.01)
(Continued)

(52) U.S. Cl.
CPC .............. *G06F 17/214* (2013.01); *G06F 3/03* (2013.01); *G06F 17/212* (2013.01); *G06F 17/2294* (2013.01); *G09G 5/243* (2013.01); *G09G 5/26* (2013.01); *G09G 5/30* (2013.01); *G09G 2340/145* (2013.01)

(58) Field of Classification Search
CPC .............................. G06F 17/214; G06F 17/211
See application file for complete search history.

(56) References Cited

U.S. PATENT DOCUMENTS 5,577,170 A 11/1996 Karow
5,803,629 A * 9/1998 Neville ................. G06F 17/214
400/304

(Continued)

OTHER PUBLICATIONS

Bosler, Denise, Mastering Type 83 (How Books 2012).*

*Primary Examiner* — Keith Bloomquist
*Assistant Examiner* — Shahid Khan
(74) *Attorney, Agent, or Firm* — Ronald Fernando (57) ABSTRACT

A system, method and non-transitory, computer-readable storage medium are disclosed for implementing dynamic layout rules for attributed text strings having different type styles. In some implementations, developers can use an Application Programming Interface (API) or a design tool to specify dynamic text layout rules for rendering attributed text strings in a user interface (UI). Various text attributes associated with the different type styles (e.g., font metrics) are dynamically adjusted based on the dynamic text layout rules to improve the readability of the text when, for example, font sizes are adjusted. In some implementations, one or more parameters of a text container, text container region, line-fragment or display object are dynamically adjusted based on the dynamic text layout rules to improve the readability of the text.

18 Claims, 8 Drawing Sheets

(51) Int. Cl.
*G09G 5/26* (2006.01)
*G06F 17/22* (2006.01)
*G06F 3/03* (2006.01)
*G09G 5/30* (2006.01)

(56) References Cited

U.S. PATENT DOCUMENTS

| | | | | |
|---|---|---|---|---|
| 6,986,103 B1* | 1/2006 | Beezer | ............... | G06F 17/211 |
| | | | | 715/200 |
| 2004/0123243 A1 | 6/2004 | Everett | | |
| 2012/0304068 A1 | 11/2012 | Zaman et al. | | |
| 2013/0127703 A1* | 5/2013 | Wendt | ............... | G06F 17/211 |
| | | | | 345/156 |
| 2014/0365881 A1 | 12/2014 | Suarez et al. | | |

* cited by examiner

DYNAMIC TEXT LAYOUT RULES

CROSS-REFERENCE TO RELATED APPLICATIONS

This application claims priority to U.S. Provisional Application Ser. No. 62/005,706, entitled "Dynamic Text Layout Rules," filed on May 30, 2014, the entire contents of which are incorporated herein by reference.

TECHNICAL FIELD

This disclosure relates generally to layout rules for rendering attributed text on computer displays.

BACKGROUND

A computer font is an electronic data file containing a set of glyphs, characters or symbols. Some fonts are scalable, such as outline fonts. Outline fonts use Bézier curves, drawing instructions and mathematical formulae to describe each glyph. Outline fonts can be resized using a single font and substituting different measurements for components of each glyph. The outline can be rendered to a bitmap for display on a computer screen. Fonts for display on a computer screen are commonly referred to as screen fonts and can be designed using a font editor. Screen fonts can be monospaced, such that every character is plotted a constant distance from a previous adjacent character while drawing. Fonts can also be proportional, such that each character has its own width. Kerning is the process of adjusting the spacing between characters in a proportional font. Tracking adjusts spacing uniformly over a range of characters. Leading refers to the distance between baselines of text. Text that is displayed on a computer screen without leading can be difficult to read due to a lack of white space between the lines of text.

SUMMARY

A system, method and non-transitory, computer-readable storage medium are disclosed for implementing dynamic text layout rules for attributed text strings having different type styles. In some implementations, developers can use an Application Programming Interface (API) or a design tool to specify dynamic text layout rules for rendering attributed text strings in a user interface (UI). Various text attributes associated with the different type styles (e.g., font metrics) are dynamically adjusted based on the dynamic text layout rules to improve the readability of the text when, for example, font sizes are adjusted. In some implementations, one or more parameters of a text container, text container region, line-fragment or display object are dynamically adjusted based on the dynamic text layout rules to improve the readability of the text.

In some implementations, a method comprises: obtaining, by an electronic device, two or more attributed text strings to be rendered in a user interface (UI) for display on a screen of the electronic device, each attributed text string having a type style; dynamically adjusting text layout rules for arranging the attributed text strings in the UI in response to input; and rendering the attributed text strings in the UI according to the type styles and the dynamically adjusted text layout rule. Other implementations are disclosed for systems, methods and computer-readable mediums.

Particular implementations disclosed herein provide one or more of the following advantages. The disclosed implementations provide application developers and UI designers more flexibility in designing great looking UIs that preserve text readability when font sizes are adjusted, for example, by a user or programmatically by an application or operating system.

The details of the disclosed implementations are set forth in the accompanying drawings and the description below. Other features, objects, and advantages will be apparent from the description and drawings and from the claims.

DESCRIPTION OF DRAWINGS

The same reference symbol used in various drawings indicates like elements.

DETAILED DESCRIPTION

Example Setting Control Object

Figure 1:
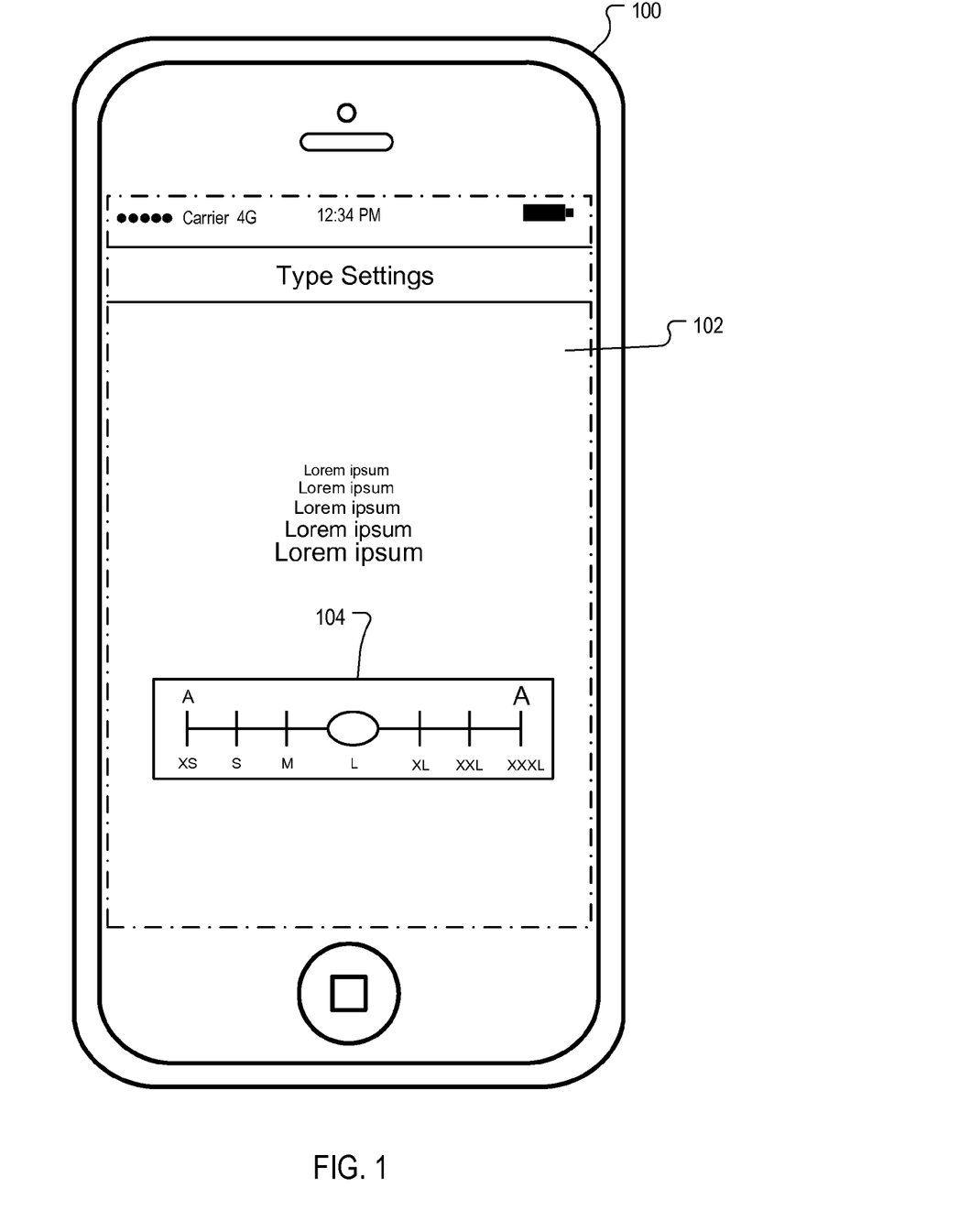
FIG. 1 illustrates an example control object for adjusting font size.

FIG. 1 illustrates an example control object for adjusting font size. Font size can be represented in points, where a point (pt) is the smallest unit of measure for a font. In the description that follows, the point is the unit for measuring font size and leading.

In some implementations, electronic device 100 presents graphical user interface (GUI) 102 on a display screen of device 100. GUI 102 includes control object 104, which can be manipulated by a user to adjust the font size to be used on text throughout an application running on device 100. In the example shown, control object 104 is a slider control. A user can move the slider to the right to adjust the font size to a predefined font size. For example, the user can select from the following predefined font sizes: XS (extra small), S (small), M (medium), L (large), XL (extra large), XXL (extra, extra large) and XXXL (extra, extra, extra large). Control object 104 can be exposed through a settings screen provided by an application or an operating system for device 100.

Device 100 can include a system for managing typefaces. A typeface or font family is a set of one or more fonts each composed of glyphs that share common design features (e.g., Times New Roman, Arial). Each font of a typeface has a specific weight, style, condensation, width, slant, italicization and ornamentation. An application developer can specify a predefined type style for text using an Application Programming Interface (API). Each type style can use a specific typeface. Some examples of predefined type styles can include but are not limited to: Headline 1, Headline 2, Subheadline 1, Subheadline 2, Body, Footnote, Caption 1 and Caption 2. Other type styles are also possible. In some implementations, a typeface can include optical fonts that can be scaled to different sizes.

When the developer specifies a predefined type style for text, the operating system or service installed on the device will render the text according to the predefined type style. For example, if the developer specifies a text string "My Calendar" as Headline 1, and Headline 1 uses the typeface "Helvetica," then the text string "My Calendar" will be rendered in Helvetica. Predefined type styles allow a typeface designer or other expert to create great looking type for specific purposes, which can be leveraged by application developers who may not have the time or expertise to select a suitable typeface or font characteristics for text displayed by an application. In some implementations, a type style can include one or more traits. Some examples of traits include but are not limited to: bold, italic, expanded, condensed, monospace, vertical, tight leading and loose leading.

Figure 2:
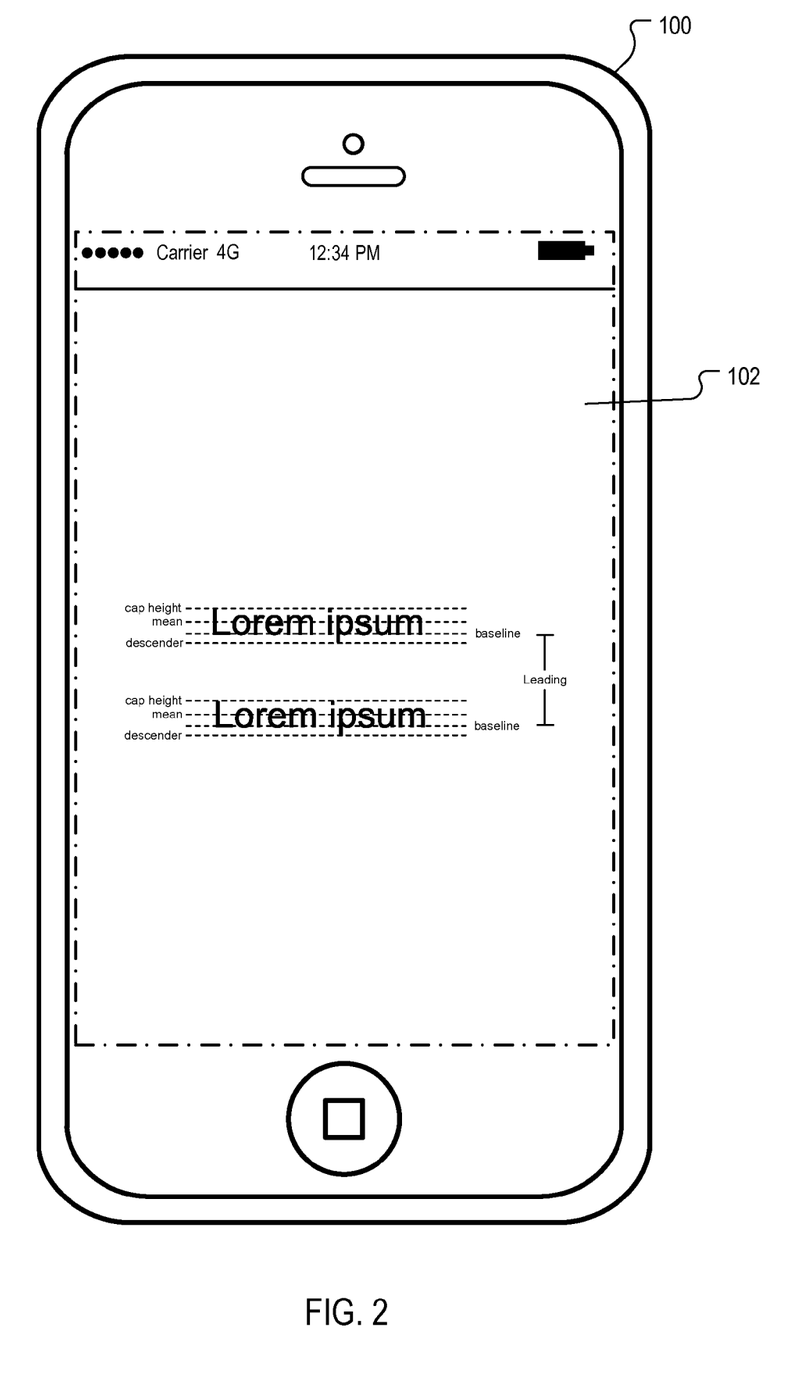
FIG. 2 illustrates the use of leading in text.

FIG. 2 illustrates the use of leading in text. If device 100 allows a user to adjust the font size for text used in an application, a predefined type style for a given font size may provide poor results unless one or more metrics for the font (e.g., leading, tracking, kerning) are also adjusted. The reason for this is that the predefined type style was designed to look good for a particular font size. When that font size is changed by a user (e.g., using control object 104), the default leading (white space) associated with the predefined type style may be too large or too small (too much or too little white space between lines), reducing the readability of the text.

As illustrated in FIG. 2, leading is defined as the distance between the baselines of successive lines of type. The baseline of a font is the line upon which most letters sit and below which descenders extend. A descender is the portion of a letter that extends below the baseline of the font. An ascender is the portion of a letter that extends above the mean line of a font or the part of a lower-case letter that is taller than the font's x-height. The x-height refers to the distance between the baseline and the mean line in a typeface. Fonts can have built-in, default leading. As will be described in reference to FIG. 3, adjusting the default leading can result in better looking text.

Example System

Figure 3:
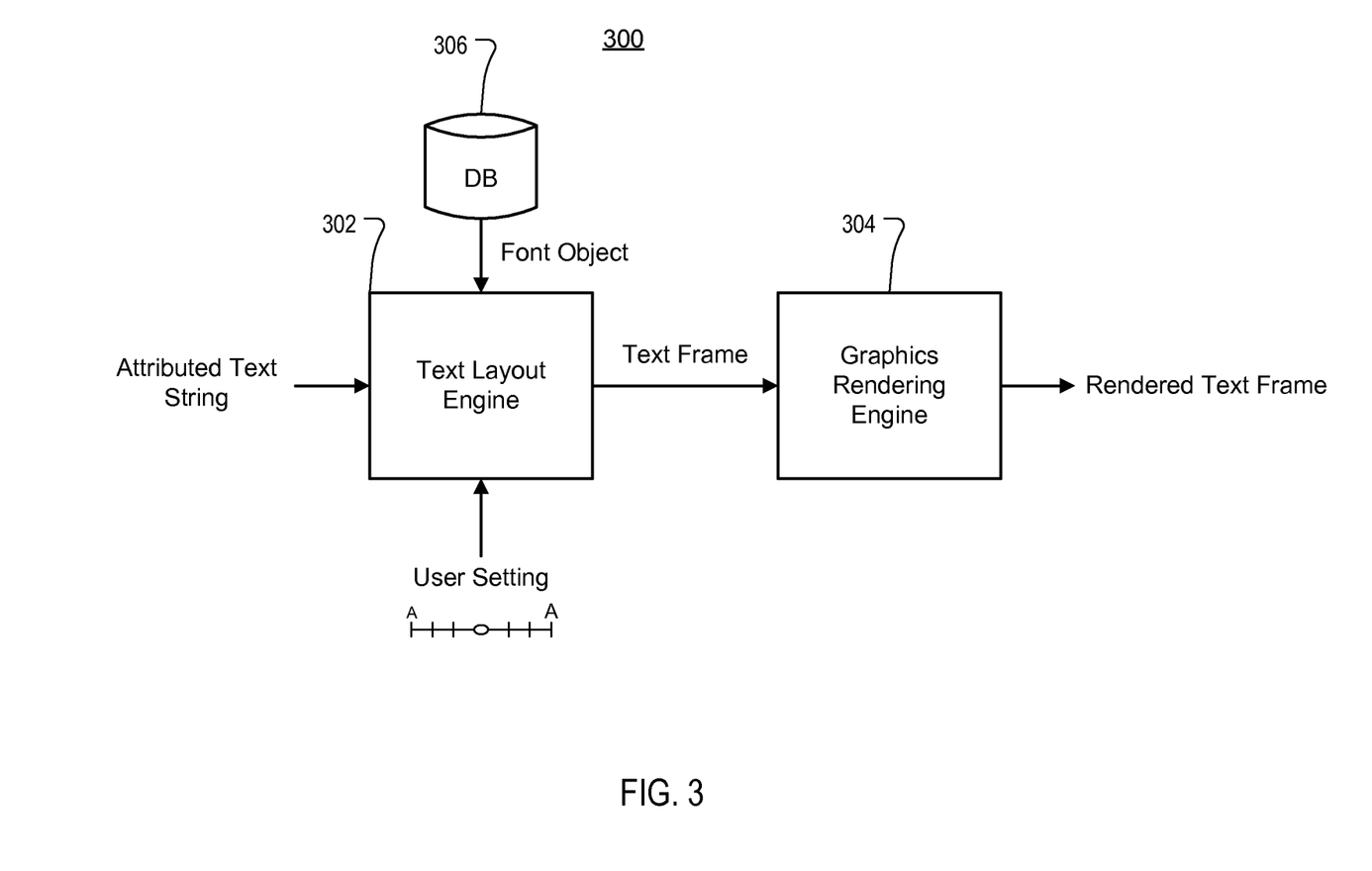
FIG. 3 is a block diagram of an example system for dynamically adjusting font metrics.

FIG. 3 is a block diagram of an example system for dynamically adjusting font metrics. In some implementations, system 300 includes text layout engine 302, graphics rendering engine 304 and data store 306. System 300 is one example of a system for dynamically adjusting font metrics. Other systems with more or fewer components are also possible. System 300 can perform text layout operations and handle the adjusting of font metrics. System 300 can be implemented in an operating system as a service that can be called by applications that need text rendering. As used herein, the term "text" means any character that can be rendered, including alphanumeric characters and symbols.

Text layout engine 302 can take an attributed text string as input and provide a text frame as output. In some implementations, the attributes can be key-value pairs that define type style characteristics of the characters in the string, and can be grouped in ranges that share the same attributes (e.g., font, color). The text frame can be input to graphics rendering engine 304, which renders the text frame into a graphic suitable for display on a display device. An example text layout engine 302 is provided as part of the publicly available Mac OS Core Text framework, developed by Apple Inc., Cupertino, Calif., USA.

In some implementations, text layout engine 302 performs character-to-glyph conversion including generating glyphs from characters and positioning the glyphs into glyph runs, lines and multiline frames. Characters can be numbers representing code points in a character set or encoding scheme, such as the Unicode character set. A glyph is a graphic shape used to depict a character, and can also be represented by numeric codes, called glyph codes, that are indexes into a particular font. Glyphs can be selected during composition and layout processing by the character-to-glyph conversion process.

In some implementations, fonts can be optical fonts that can be scaled to different sizes. Optical scaling modifies the relative shape of a character to compensate for the visual effects of changing the size of a character. For example, as a character gets smaller, the relative stroke thickness increases. Conversely, as a character gets larger, the relative stroke thickness decreases.

Font objects stored in data store 306 can be used by text layout engine 302 to provide assistance in laying out glyphs relative to one another and to establish the current font when drawing in a graphics context. A font object can include information about a font at a particular point size, including character-to-glyph mapping, encodings, font metric data and glyph data. Font metrics are parameters such as ascent, descent, leading, cap height, x-height (difference between baseline and mean line), etc. Glyph data includes parameters such as bounding rectangles and glyph advances. A font object can be created and modified using a font descriptor.

Graphics rendering engine 304 can be a two-dimensional renderer and composition engine that sends instructions to a graphics card that includes one or more graphics processing units (GPUs). An example graphics rendering engine 304 is Quartz 2D® developed by Apple Inc.

Figure 4:
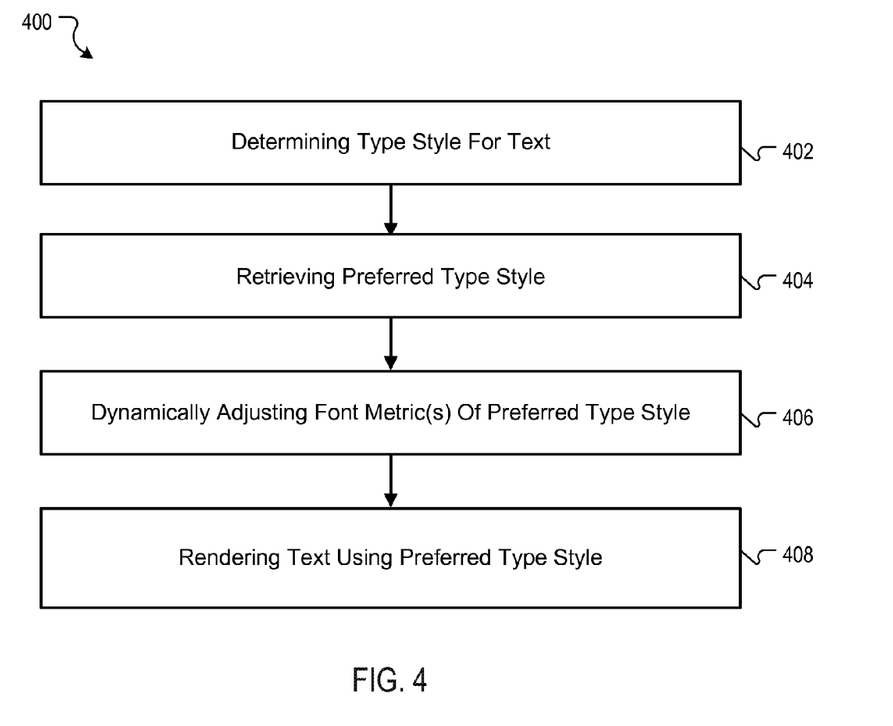
FIG. 4 is a flow diagram of an example method of dynamically adjusting font metrics.

As described in reference to FIG. 4, various font metrics, such as leading, tracking and kerning can be dynamically adjusted by text layout engine 302 when a font size is changed according to a user setting. When a user setting has changed the font size, a font object of the preferred type style associated with the new font size is retrieved from data store 306, and one or more default font metrics for the type style (e.g., leading, tracking, kerning) are dynamically (e.g., programmatically) adjusted according to one or more rules.

Example Process for Dynamic Adjustment of Font Metrics

FIG. 4 is a flow diagram of an example method 400 of dynamically adjusting font metrics. Method 400 can be implemented using the device architecture described in reference to FIG. 8.

In some implementations, method 400 can begin by determining a type style for a text string (402). For example, a type style can be selected from a set of predefined type styles that are associated with certain fonts and font characteristics (e.g., weight, character width). The fonts can be associated with font objects that include font metrics (e.g., leading, tracking, kerning) that can be adjusted dynamically according to user settings (e.g., font size change). The fonts can be optical fonts that can be scaled to different sizes.

Method 400 can continue by retrieving a preferred type style (404). An application may specify a type style for a text string at a default font size. If, however, a user has specified a preferred font size, a preferred type style is retrieved for the preferred font size.

Method 400 can continue by dynamically adjusting the font metrics for the preferred type style (406). For example, font metrics, such as a default leading parameter, can be adjusted according to one or more rules. An example rule can specify using the default leading, or reducing or increasing the default leading by a fraction of the default leading. In some implementations, only the default leading for the upper line of vertically adjacent lines of text is adjusted. In other implementations, only the default leading for the lower line is adjusted. In still other implementations, the default leadings for the upper and lower lines of text are adjusted.

In some implementations, the font metrics can be adjusted using a mathematical expression. For example, a leading can be adjusted using the linear equation y=ax+b, where y is the new leading, x is the old leading, a is a scalar (e.g., 0<a≤1) and b is a constant value and where the units of the variables are in points.

In another example, the tracking associated with a type style can be dynamically adjusted to improve the readability of the text. Tracking refers to a consistent degree of increase (or decrease) of space between letters to affect density in a line or block of text.

Method 400 can continue by rendering the text string using the preferred type style (408). For example, a text layout engine can generate a text frame that includes glyphs and other data that allows a graphics rendering engine to render the text frame according to the preferred type style and adjusted font metrics.

Dynamic Text Layout Rules

Figure 5:
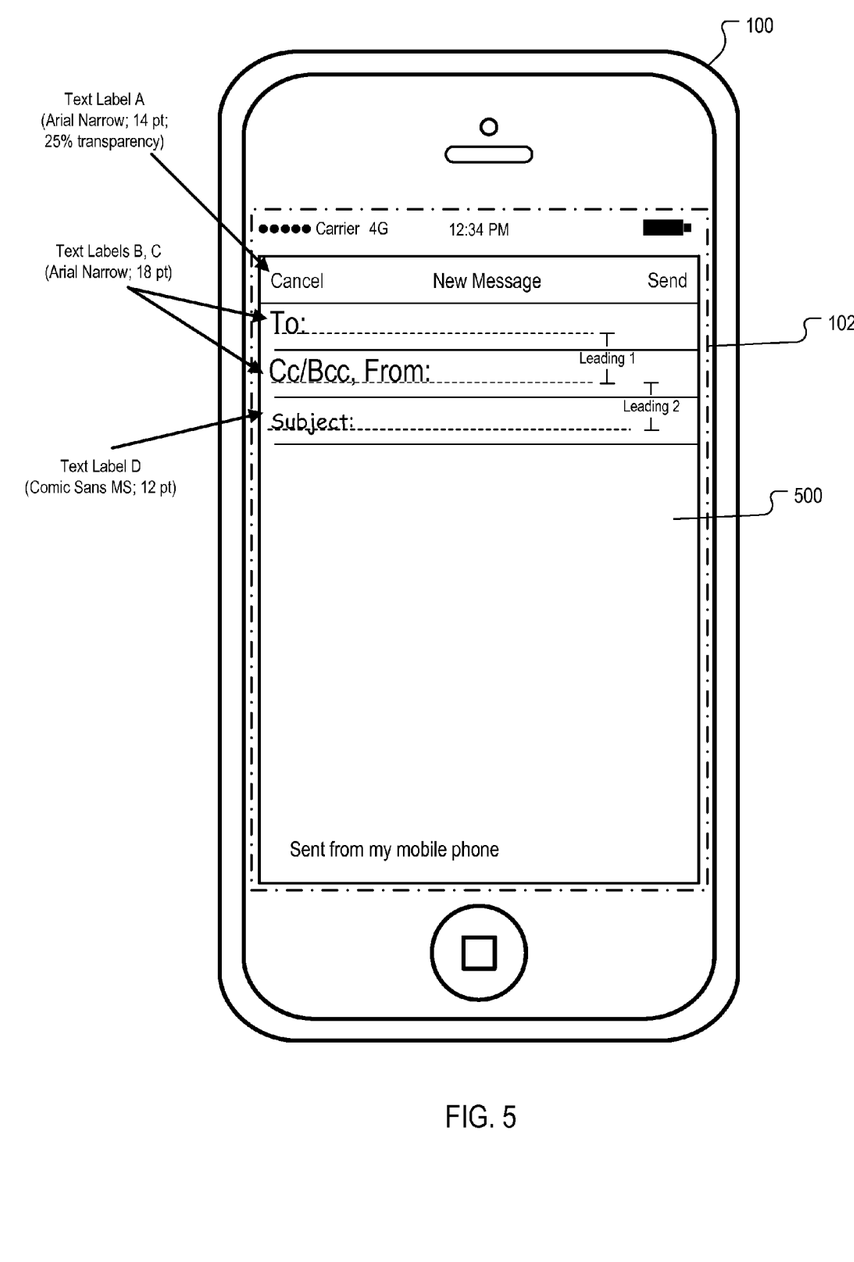
FIG. 5 illustrates example dynamic text layout rules for text labels in a UI.

FIG. 5 illustrates example dynamic text layout rules for text labels in a UI. In the example shown, UI 500 for an e-mail application is displayed on touch-sensitive display 102 of mobile device 100. UI 500 includes text labels A, B, C and D. Each text label is an attributed string that has been rendered in UI 500. Text label A is for a "cancel" button and is rendered in a first type style that includes the font <Arial Narrow, 14 point, 25% transparency>. Text label B is for a "To:" field and is rendered in a second type style that includes the font <Arial Narrow, 18 point>. Text label C is for a "Cc/Bcc:" field and is rendered in a third type style that includes the font <Ariel Narrow, 12 point>. Text label D is for a "Subject" field and is rendered in a fourth type style that includes the font <Comic Sans MS, 14 point>.

To improve the readability of text labels A-D when rendered together in UI 500, the dynamic text layout rules of the text labels can be dynamically adjusted by changing various text attributes, such as default leadings and tracking, which in some implementations are built into the fonts. In some implementations, the default leadings are dynamically adjusted by a text layout engine (e.g., text layout engine 302) using linear equations, as described in reference to FIG. 4. For example, the default leadings 1 and 2 can be reduced or increased by a fraction (e.g., 0.5) of the default leadings to adjust the amount of whitespace in the gap between the baselines of text labels, as illustrated in FIG. 5.

Figure 6A:
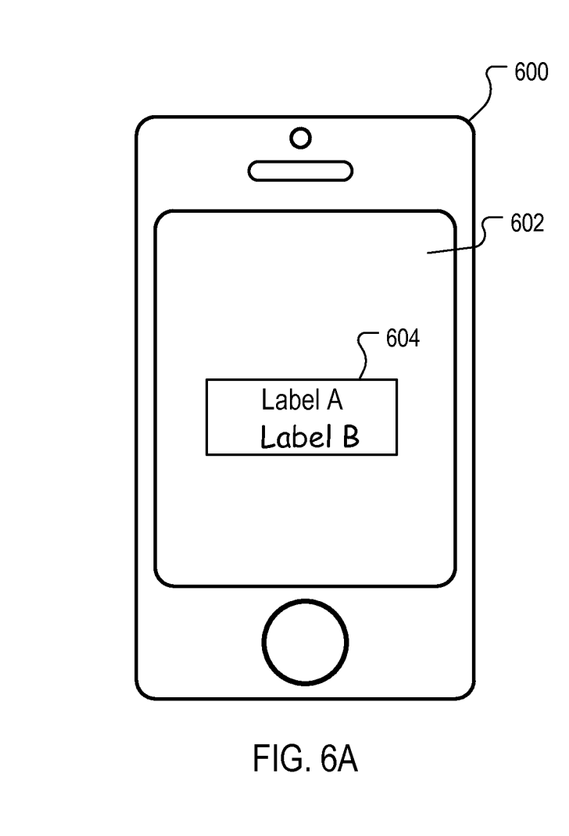
FIGS. 6A and 6B illustrate example dynamic text layout rules for text container objects, display objects and line fragment rectangles.
Figure 6B:
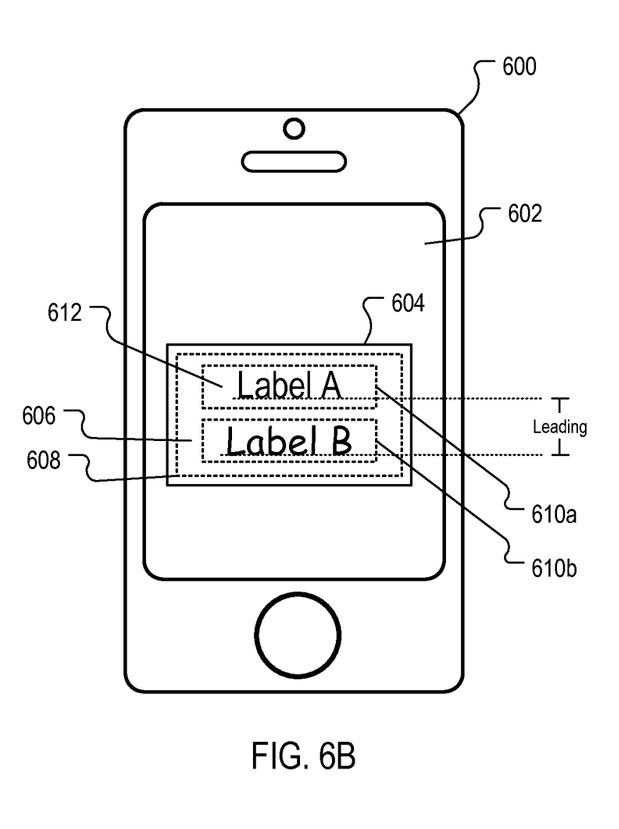

FIGS. 6A and 6B illustrate example dynamic text layout rules for text container objects, display objects and line fragments. Referring to FIG. 6A, device 600 includes display screen 602 presenting display object 604. Display object 604 includes text labels A and B. Each of the text labels A and B have been rendered in display object 604 at a default font size using different type styles.

In response to input (e.g., user or programmatic), the font sizes of the text labels A and B are increased, as shown in FIG. 6B. For example, to accommodate the increased font sizes of text labels A and B, bounding rectangle 608 of the text container object and display object 604 are proportionally adjusted (or fractionally adjusted) to accommodate the text and avoid text wrap around.

To preserve readability of the text labels A and B, the dynamic layout rules for text labels A and B can be adjusted. For example, the default leadings can be adjusted by fractional amounts to increase the amount of white space in the gap between the baselines of the text labels A and B. Additionally, a mathematical relationship between the text labels A and B and bounding rectangle 608 and display object 604 can be specified. For example, a linear equation can relate the height and width of bounding rectangle 608 to the leadings between text labels A and B. In some implementations, a dynamic text layout rule can specify that when the font size of text label A and B in display object 604 increases or decreases, bounding rectangle 608 increases or decreases proportionally. Also, dynamic text layout rules can specify an increase or decrease in line fragment padding 612 of line fragment rectangles 610a, 610b or the size and/or shape of text container region 606. For example, a UI designer can specify that whenever text labels A and B are rendered together in display object 604, the leading between the baselines of text labels A and B will be one quarter (0.25) the default leadings. The UI designer can also specify how much to increase or decrease bounding rectangle 608 and/or display object 604 due to an increase or decrease in font size. Below are example dynamic text layout rules implemented as mathematical relationships among the leading between text labels A and B, bounding rectangle 608 and display object 604 when the font size of text labels A and B increases.

{
new_leading=(0.5)*default_leading+default_leading; // increase default leading by ½ the default leading//
new_bounding_rect_h=default_bounding_rect_h+new_leading; //increase height of bounding rectangle in proportion to increase in leading//
new_bounding_rect_w=default_bounding_rectangle_area/new_bounding_rect_h; //increase width of bounding rectangle proportional to height//
new_display_object_h=default_display_object_h+new_bounding_rect_h; //increase height of display object proportionally//
new_display_object_w=default_display_object_area/new_display_object_h; //increase width of display object proportion to height//
}

In some implementations, the size or area of display object 604 can be constrained below a maximum threshold size based on the size of the display screen of the device and locations of other display objects in the UI.

Figure 7:
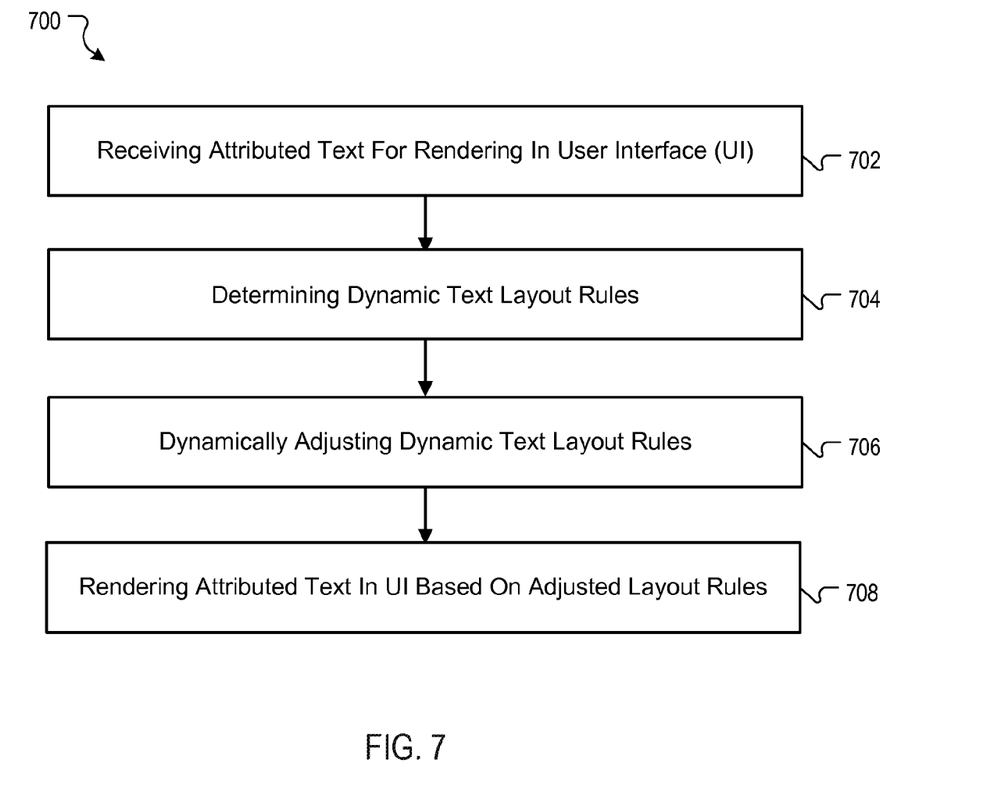
FIG. 7 is a flow diagram of an example method of dynamically adjusting layout rules for attributed text strings.

FIG. 7 is a flow diagram of an example process 700 of dynamically adjusting text layout rules for attributed text strings. In some implementations, process 700 can be implemented using example device architecture 800, as described in reference to FIG. 8.

In some implementations, process 700 can begin by receiving attributed text for rendering in a user interface (702). The attributed text can be received, for example, through an API. Process 700 can continue by determining dynamic text layout rules (704). The dynamic text layout rules can be expressed by equations (e.g., linear equations). Process 700 can continue by dynamically adjusting the text according to the dynamic text layout rules (706). For example, leadings, tracking or other text attributes can be adjusted according to one or more equations in response to a change in font size of a text label. One or more of text container objects, text container regions, line fragment padding and display objects can also be adjusted in response to a change in font size. Process 700 can continue by rendering the attributed text in the user interface based on the adjusted dynamic text layout rules (708).

Example Device Architecture

Figure 8:
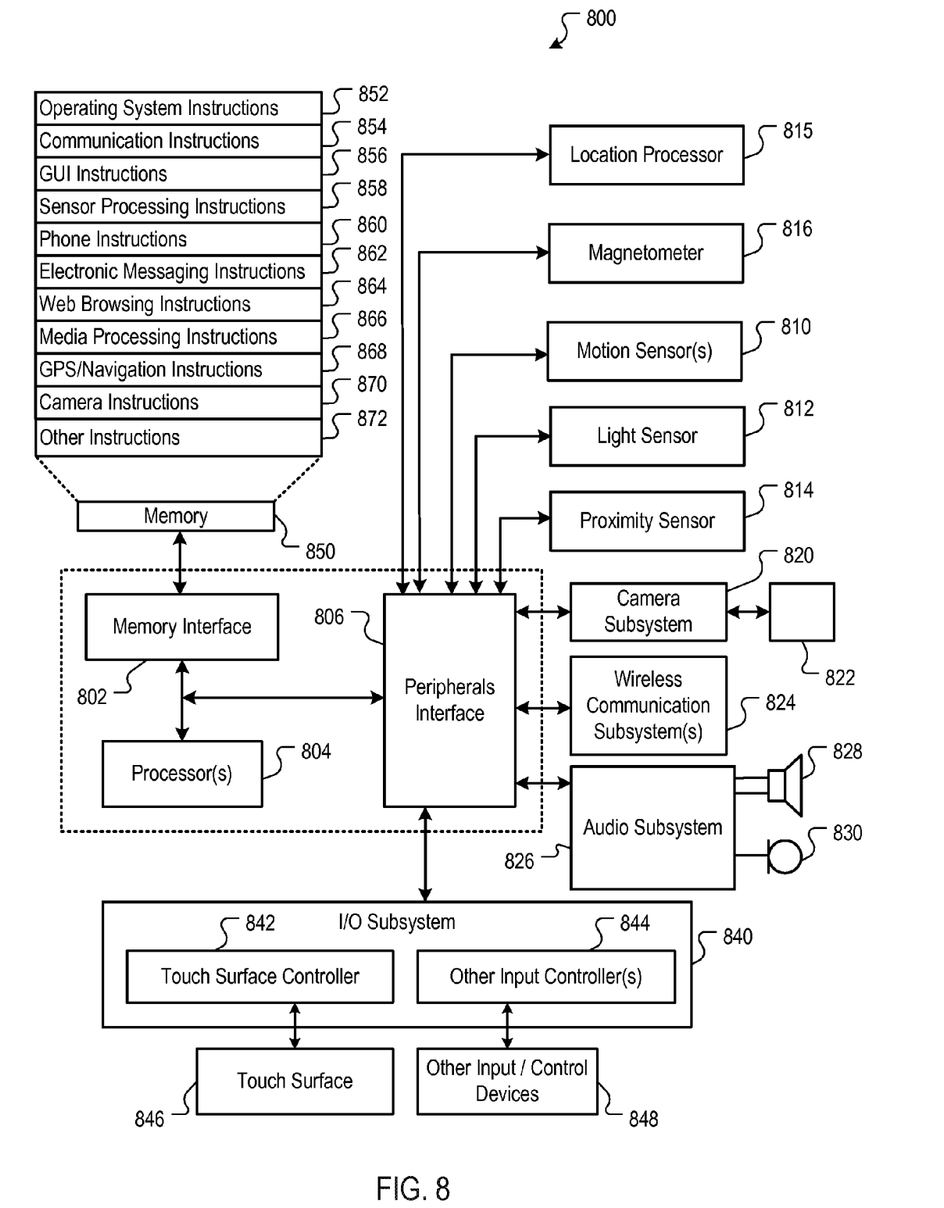
FIG. 8 is a block diagram of example device architecture for implementing the systems and methods described in reference to FIGS. 1-7.

FIG. 8 is a block diagram of an exemplary architecture of a device capable of implementing the features and processes described in reference to FIGS. 1-7.

Architecture 800 may be implemented in any device for generating the features described in reference to FIGS. 1-7, including but not limited to portable or desktop computers, smart phones and electronic tablets, television systems, game consoles, kiosks and the like. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functionalities. For example, motion sensor 810, light sensor 812, and proximity sensor 814 may be coupled to peripherals interface 806 to facilitate orientation, lighting, and proximity functions of the device. For example, in some implementations, light sensor 812 may be utilized to facilitate adjusting the brightness of touch surface 846. In some implementations, motion sensor 810 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 806, such as a temperature sensor, a biometric sensor, or other sensing device, to facilitate related functionalities.

Location processor 815 (e.g., GPS receiver) may be connected to peripherals interface 806 to provide geo-positioning. Electronic magnetometer 816 (e.g., an integrated circuit chip) may also be connected to peripherals interface 806 to provide data that may be used to determine the direction of magnetic North. Thus, electronic magnetometer 816 may be used as an electronic compass.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 824 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 826 may be coupled to a speaker 828 and one or more microphones 830 to facilitate voice-enabled functions, such as voice recognition, voice replication, digital recording, and telephony functions.

I/O subsystem 840 may include touch controller 842 and/or other input controller(s) 844. Touch controller 842 may be coupled to a touch surface 846. Touch surface 846 and touch controller 842 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 may display virtual or soft buttons and a virtual keyboard, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device 800 may present recorded audio and/or video files, such as MP3, AAC, and MPEG files. In some implementations, device 800 may include the functionality of an MP3 player and may include a pin connector for tethering to other devices. Other input/output and control devices may be used.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers. Communication instructions 854 may also be used to select an operational mode or communication medium for use by the device, based on a geographic location (obtained by the GPS/Navigation instructions 868) of the device. Memory 850 may include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes; camera instructions 870 to facilitate camera-related processes and functions; and other instructions 872 for facilitating other processes, features and applications, such as the features and processes described in reference to FIGS. 1-4.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic type such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   at an electronic device with a display and one or more input devices;
      displaying on the display of the electronic device, a first text string with a first type style and a second text string with a second type style, wherein the first type style is different than the second type style;

the first text string is displayed proximate to the second text string on the display with a first spatial arrangement that is determined based at least in part on the first type style and the second type style;

after displaying the first text string and the second text string on the display, receiving, via the one or more input devices, input that changes a font size of the first text string and changes the respective font size of the second text string;

in response to receiving the input, dynamically adjusting, by the electronic device, one or more font metrics that determine the spatial arrangement of text in accordance with text layout rules based on the first type style and the second type style; and displaying, on the display of the electronic device, the first text string and the second text string with the respective font size changed and with a second spatial arrangement that is determined based on the first type style, the second type style and the dynamically adjusted one or more font metrics.

2. The method of claim 1, wherein receiving the input comprises receiving one or more of a user input and a programmatic input.

3. The method of claim 1, wherein dynamically adjusting the one or more font metrics comprises:
adjusting a size of a bounding rectangle of a text container object for at least on of the first text string and the second text string.

4. The method of claim 3, wherein dynamically adjusting the one or more font metrics further comprises:
adjusting one or more of a size and a shape of a text container region of the text container object.

5. The method of claim 1, wherein dynamically adjusting the one or more font metrics comprises:
adjusting line fragment padding for at least one of the first text string and the second text string.

6. The method of claim 1, wherein dynamically adjusting the one or more font metrics comprises:
adjusting a size of a display object for displaying at least one of the first text string and the second text string.

7. The method of claim 1, wherein at least one of the text layout rules specifies an amount of leading between baselines of text strings.

8. The method of claim 1, wherein at least one of the text layout rules specifies a linear equation.

9. The method of claim 8, where the linear equation is a sum of a default leading and a fraction of the default leading.

10. A system comprising:
a display;
one or more input devices;
one or more processors; and
a memory coupled to the one or more processors and configured for storing instructions, which, when executed by the one or more processors, causes the one or more processors to perform operations comprising:
displaying, on the display, a first text string with a first type style and a second text string with a second type style, wherein the first type style is different than the second type style;

the first text string is displayed proximate to the second text string on the display with a first spatial arrangement that is determined based at least in part on the first type style and the second type style;

after displaying the first text string and the second text string on the display, receiving, via the one or more input devices, input that changes a font size of the first text string and changes the respective font size of the second text string;

in response to receiving the input, dynamically adjusting one or more font metrics that determine the special arrangement of text in accordance with text layout rules based on the first type style and the second type style; and displaying, on the display, the first text string and the second text string with the respective font size changed and with a second spatial arrangement that is determined based on the first type style, the second type style and the dynamically adjusted one or more font metrics.

11. The system of claim 10, wherein receiving the input comprises receiving one or more of a user input and a programmatic input.

12. The system of claim 10, wherein dynamically adjusting the one or more font metrics comprises:
adjusting a size of a hounding rectangle of a text container object for at least one of the first text string and the second text string.

13. The system of claim 12, wherein dynamically adjusting the one or more font metrics further comprises:
adjusting one or more of a size and a shape of a text container region of the text container object.

14. The system of claim 10, wherein dynamically adjusting the one or more font metrics comprises:
adjusting line fragment padding for at least one of the first text string and the second text string.

15. The system of claim 10, wherein dynamically adjusting the one or more font metrics comprises:
adjusting a size of a display object for displaying at least one of the first text string and the second text string.

16. The system of claim 10, wherein at least one of the text layout rules specifies an amount of leading between baselines of text strings.

17. The system of claim 10, wherein at least one of the text layout rules specifies a linear equation.

18. The system of claim 17, where the linear equation is a sum of a default leading and a fraction of the default leading.

* * * * *